(12) United States Patent
Perlo et al.

(10) Patent No.: US 9,649,923 B2
(45) Date of Patent: May 16, 2017

(54) ELECTRIC-PROPULSION VEHICLE

(71) Applicants: INTERACTIVE FULLY ELECTRICAL VEHICLES S.R.L., Sommariva del Bosco (CN) (IT); POLI-MODEL S.R.L., Moncalieri (TO) (IT)

(72) Inventors: Pietro Perlo, Rivoli (IT); Pietro Guerrieri, Rivoli (IT)

(73) Assignees: Interactive Fully Electrical Vehicles, S.R.L., Sommariva del Bosco (CN) (IT); Poli-Model S.R.L., Moncalieri (TO) (IT)

( * ) Notice: Subject to any disclaimer, the term of this patent is extended or adjusted under 35 U.S.C. 154(b) by 0 days.

(21) Appl. No.: 15/112,875

(22) PCT Filed: Jan. 21, 2015

(86) PCT No.: PCT/IB2015/050461
§ 371 (c)(1),
(2) Date: Jul. 20, 2016

(87) PCT Pub. No.: WO2015/110965
PCT Pub. Date: Jul. 30, 2015

(65) Prior Publication Data
US 2016/0347159 A1    Dec. 1, 2016

(30) Foreign Application Priority Data

Jan. 21, 2014 (IT) .............................. TO2014A0035
Apr. 9, 2014 (IT) .............................. TO2014A0305

(51) Int. Cl.
*B60K 1/00* (2006.01)
*B60K 1/02* (2006.01)
(Continued)

(52) U.S. Cl.
CPC .................. *B60K 1/02* (2013.01); *B60G 3/20* (2013.01); *B60K 1/00* (2013.01); *B60K 1/04* (2013.01);
(Continued)

(58) Field of Classification Search
CPC ... B60K 1/00; B60K 1/02; B60K 1/04; B60K 6/46; B60G 3/20
See application file for complete search history.

(56) References Cited

U.S. PATENT DOCUMENTS 2,812,191 A    11/1957 Kersey, Jr. et al.
3,053,547 A    9/1962 Osborne
(Continued)

FOREIGN PATENT DOCUMENTS

EP    1 950 072 A1    7/2008
EP    2 581 240 A1    4/2013
(Continued)

OTHER PUBLICATIONS

Italian Search Report dated Aug. 14, 2014, issued in IT Application No. TO20140305.
(Continued)

*Primary Examiner* — John Walters
*Assistant Examiner* — James Triggs
(74) *Attorney, Agent, or Firm* — Workman Nydegger

(57) ABSTRACT

An electric-propulsion vehicle includes a motor-driven front axle assembly (10); and a motor-driven rear axle assembly (20); wherein the above assemblies each include a supporting frame (110), two wheel-suspension units (30), an electric motor (40) for driving the wheels in rotation, a control unit (45) for controlling the aforesaid motor, a differential transmission unit (55) with one or more gear ratios, and a steering device (50) for regulating the angular position of the wheel supports of the aforesaid suspension units with respect to the
(Continued)

aforesaid frame; the motor, the suspension units, and the steering device being mounted on the aforesaid supporting frame. The two axle assemblies have altogether corresponding configurations, and constitute in themselves independent modules, already pre-assembled in their operating configuration.

20 Claims, 10 Drawing Sheets

(51) Int. Cl.
*B60G 3/20* (2006.01)
*B60K 17/354* (2006.01)
*B60K 17/34* (2006.01)
*B60K 17/356* (2006.01)
*B60K 1/04* (2006.01)
*B60K 17/348* (2006.01)
*B62D 21/11* (2006.01)
*B60K 7/00* (2006.01)

(52) U.S. Cl.
CPC .......... *B60K 17/348* (2013.01); *B60K 17/354* (2013.01); *B60K 17/356* (2013.01); *B60K 17/358* (2013.01); *B62D 21/11* (2013.01); *B60G 2200/144* (2013.01); *B60G 2206/60* (2013.01); *B60G 2300/50* (2013.01); *B60K 2001/001* (2013.01); *B60K 2001/0411* (2013.01); *B60K 2001/0416* (2013.01); *B60K 2007/0046* (2013.01); *B60K 2007/0061* (2013.01)

(56) References Cited

U.S. PATENT DOCUMENTS

| | | | |
|---|---|---|---|
| 6,086,071 A * | 7/2000 | Riley | B60G 3/20 280/5.521 |
| 2005/0212244 A1 | 9/2005 | Bobbitt, III et al. | |
| 2006/0015236 A1 | 1/2006 | Yamaguchi et al. | |
| 2011/0288706 A1 | 11/2011 | Okamura | |
| 2012/0326410 A1 | 12/2012 | West et al. | |
| 2013/0149093 A1 | 6/2013 | Kaneko et al. | |
| 2013/0240273 A1 | 9/2013 | Langer et al. | |
| 2015/0027795 A1 | 1/2015 | Hirai et al. | |

FOREIGN PATENT DOCUMENTS

| | | |
|---|---|---|
| EP | 2 818 349 A1 | 12/2014 |
| FR | 2 650 223 | 2/1991 |
| WO | 2009/017533 A1 | 2/2009 |
| WO | 2013/125287 A1 | 8/2013 |

OTHER PUBLICATIONS

Italian Search Report dated Oct. 9, 2014, issued in IT Application No. TO20140035.
International Search Report and Written Opinion dated Aug. 7, 2015, issued in PCT Application No. PCT/IB2015/050461, filed Jan. 21, 2015.
International Preliminary Report on Patentability dated Jul. 26, 2016, issued in PCT Application No. PCT/IB2015/050461, filed Jan. 21, 2015.

* cited by examiner

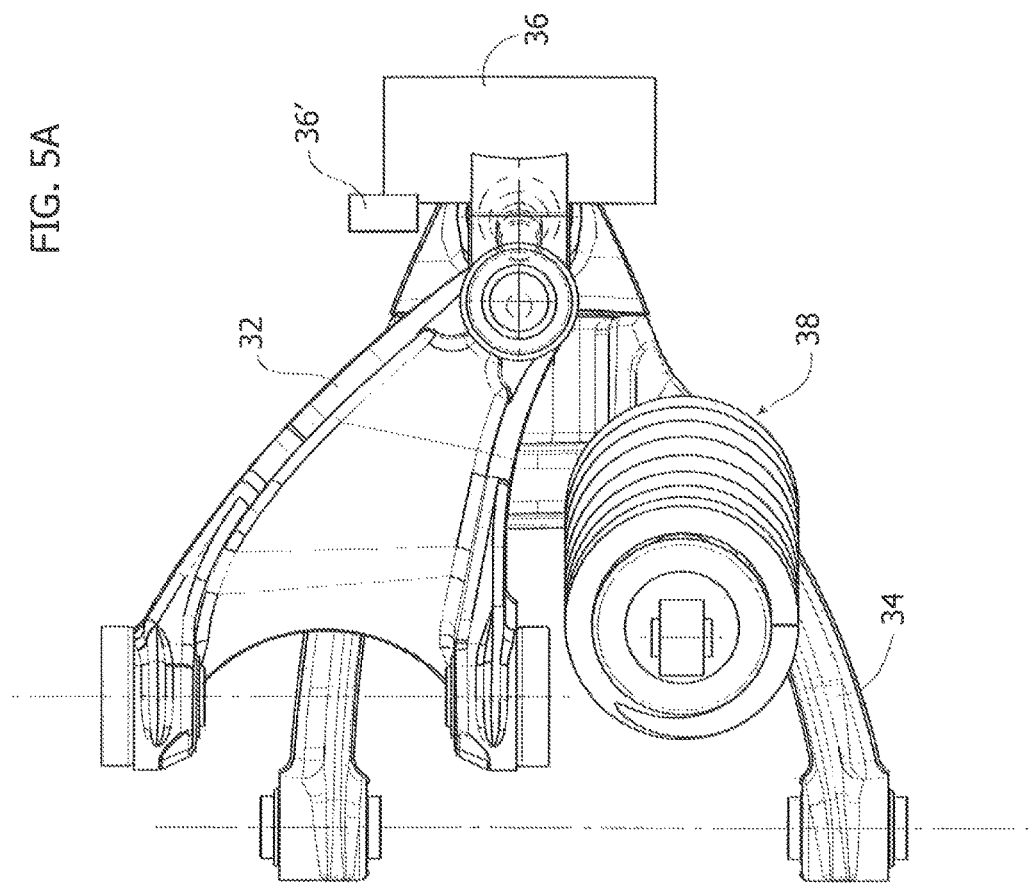

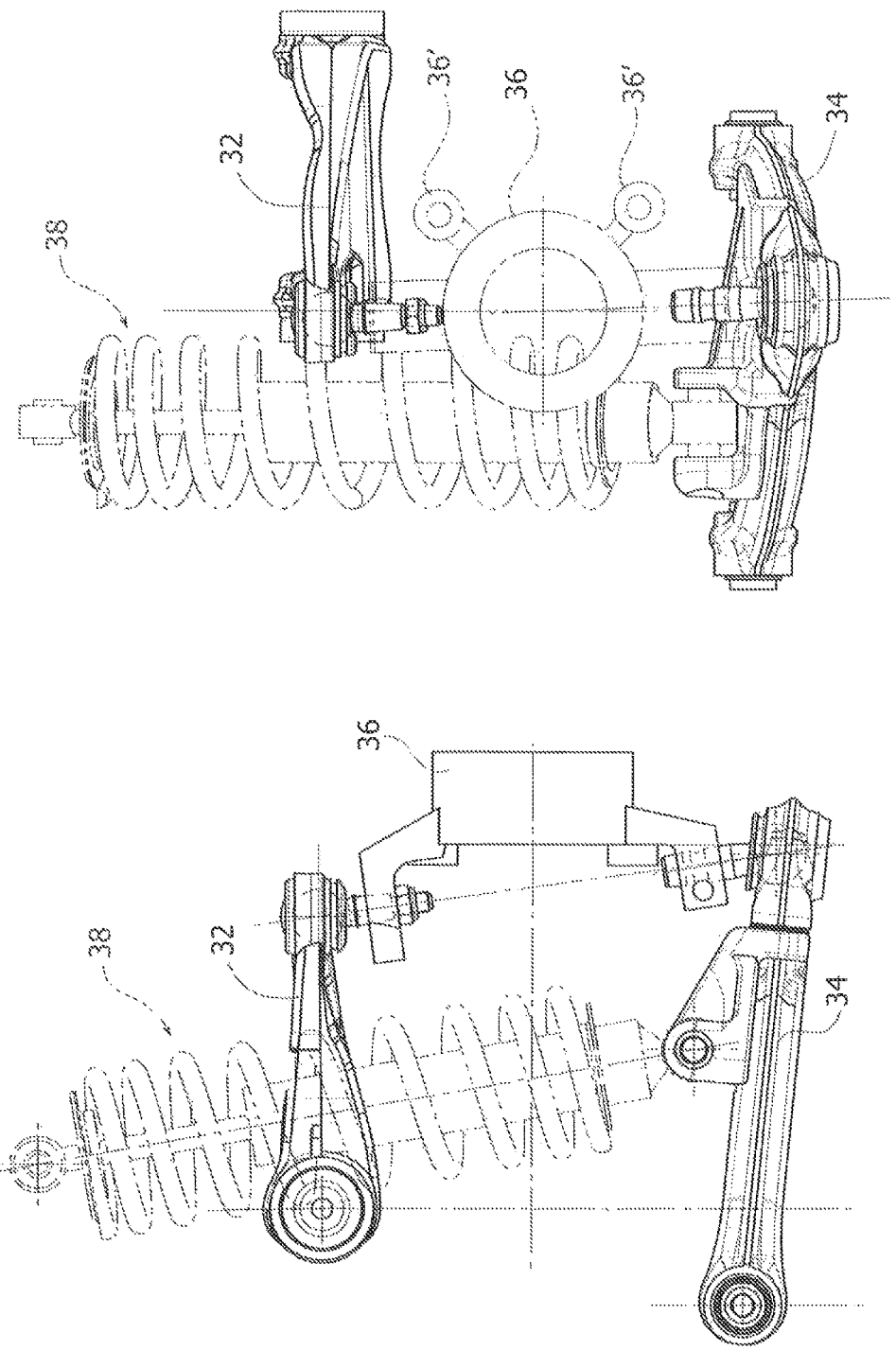

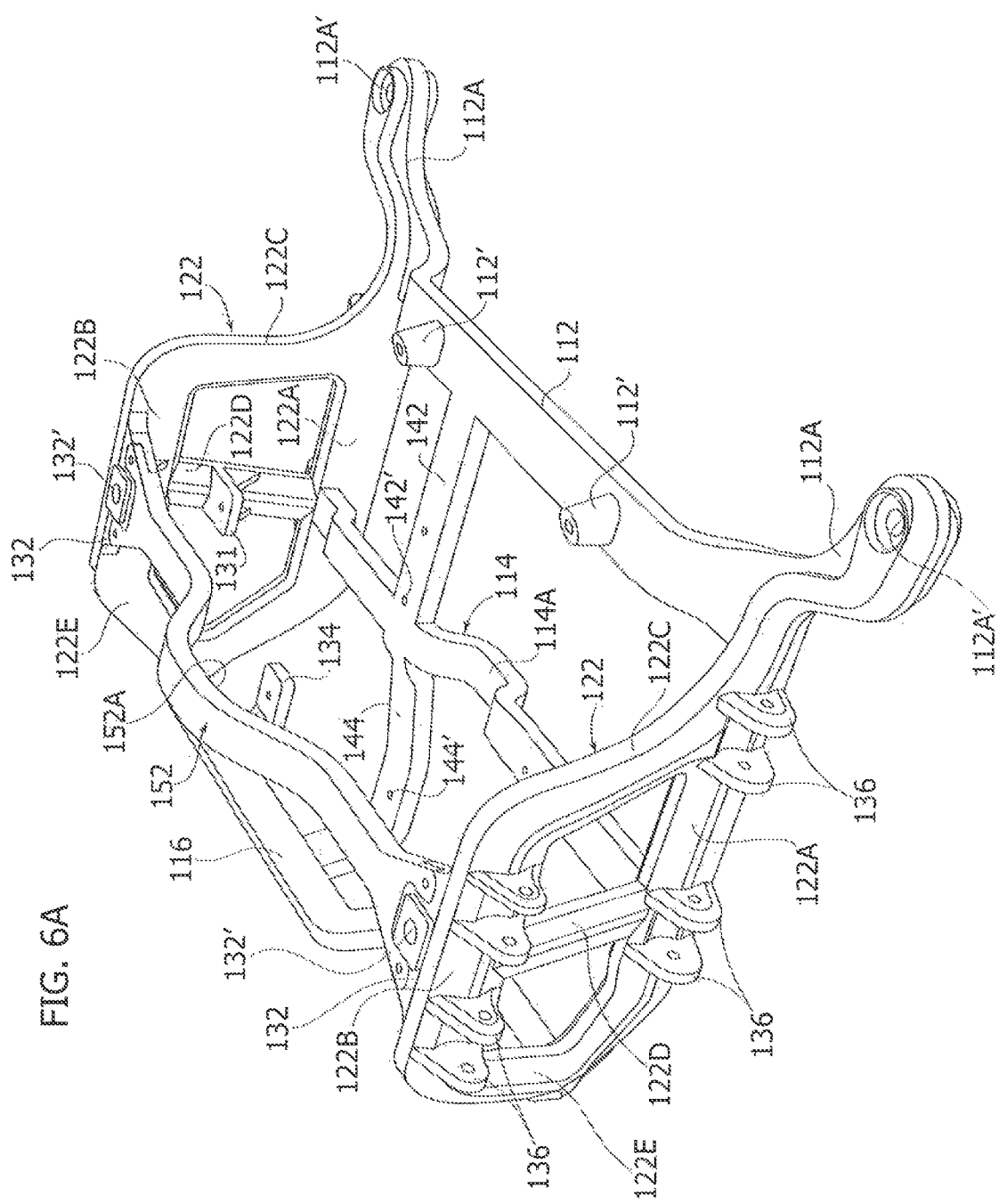

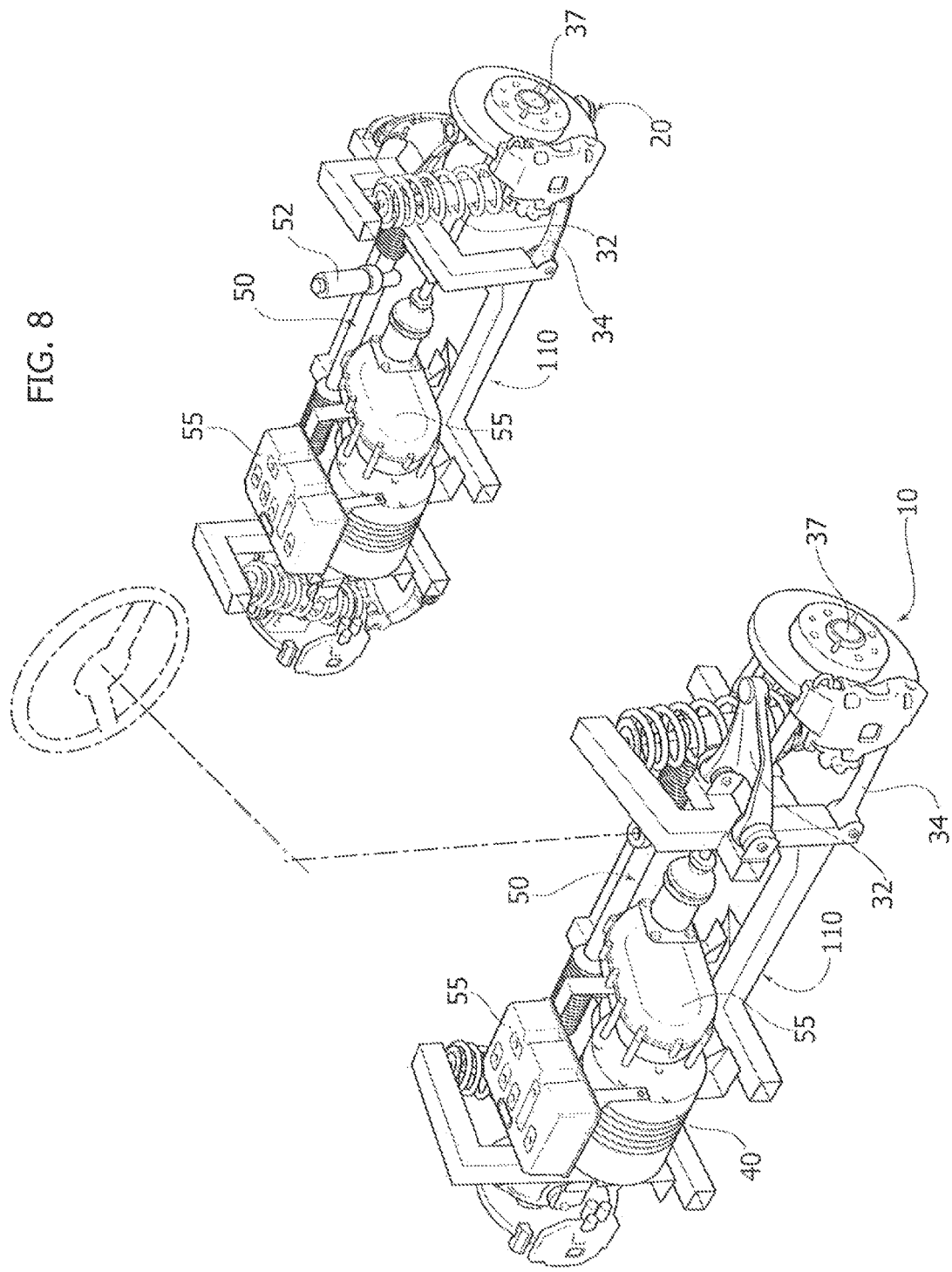

ELECTRIC-PROPULSION VEHICLE

BACKGROUND OF THE INVENTION

1. Field of the Invention

The present invention relates to an electric-propulsion vehicle of the type comprising:

a motor-driven front axle assembly; and a motor-driven rear axle assembly;

wherein said assemblies each comprise a supporting frame, two wheel-suspension units, an electric motor for driving the wheels in rotation, a control unit for control of said motor, a differential transmission unit with one or more gear ratios, and a steering device for regulating the angular position of the wheel supports of said suspension units with respect to said frame, the motor, the suspension units, and the steering device being mounted on said supporting frame.

2. Present State of the Art

Such a configuration can generally be adopted on all types of vehicles and in particular on motor vehicles belonging to the segments of city cars and superminis and small family cars. For these types of vehicles there is the need, on the one hand, to have low production costs, and, on the other, to obtain within the contained spaces that characterise them, as wide a space as possible for the passenger compartment, and to provide them moreover with an enhanced manoeuvrability.

SUMMARY OF THE INVENTION

In this context, the object of the present invention is to provide a solution that will be improved as compared to the solutions so far known. This object is achieved via a motor vehicle presenting the characteristics specified in the claims.

The claims form an integral part of the technical teaching provided herein in relation to the invention.

BRIEF DESCRIPTION OF THE DRAWINGS

Further characteristics and advantages of the invention will emerge clearly from the ensuing description with reference to the annexed drawings, which are provided purely by way of non-limiting example and in which:

FIGS. 5A, 5B, and 5C are three orthogonal views, a top plan view, a front view, and a side view, respectively, of a suspension unit of the motor vehicle of FIG. 1;

FIGS. 6A and 6B are a perspective view and a top plan view, respectively, of the enbloc frame alternative to the frame made of box-section steel plate of FIG. 2, which supports the motor, the differential, the inverter, the axles, and the steering box;

FIG. 8 illustrates the front and rear axle assemblies of a second embodiment of the motor vehicle described herein.

DETAILED DESCRIPTION OF THE PREFERRED EMBODIMENTS

In the ensuing description various specific details are illustrated aimed at providing an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

With reference to the figures, designated by the reference number 100 is an electric-propulsion vehicle obtained according to one example of embodiment of the present invention.

In general, the motor vehicle 100 comprises a front axle assembly 10 and a rear axle assembly 20 fixed, each in four points, to the opposite ends of the frame of the motor vehicle.

Figure 7:
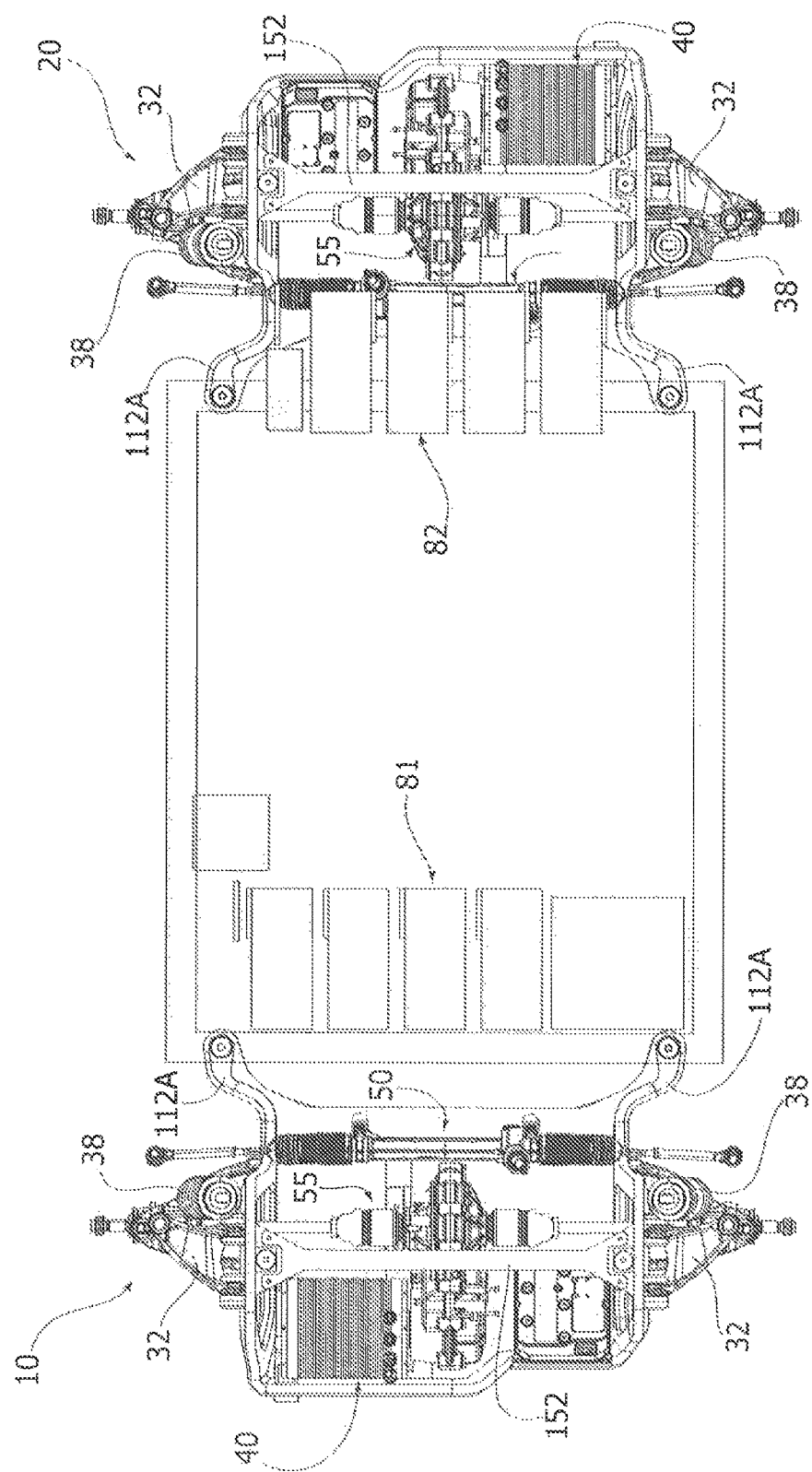
FIG. 7 is a schematic top plan view of the two independent axle assemblies with the corresponding battery packs connected to the frame of the motor vehicle.

Each axle assembly comprises two wheel-suspension units 30, which carry the wheel supports 36 (visible in FIG. 4), an electric motor 40 for driving the wheels in rotation, a control unit 45 for controlling the motor, a differential transmission unit 55 with one or more gear ratios, a steering device 50 for regulating the angular position of the wheel supports 36, and a battery pack. Each assembly moreover comprises a supporting frame 110 on which all the devices referred to are mounted. The motor control unit 45 can be installed either on the motor, as represented in FIG. 8, or alternatively on the side opposite to the differential assembly, as represented in FIG. 7. In the former case, the length of the connection cables between the motor and its controller is reduced, whereas in the latter case the overall height is reduced. The front and rear battery packs can likewise be arranged on the main frame of the vehicle either at a greater height than the axis of rotation of the wheels or else preferably on the main bottom panel as illustrated in FIG. 7.

In general, the motor vehicle described herein is characterized in that the suspension units of each assembly are of the articulated-quadrilateral type with oscillating bottom arm and top arm, and comprise a shock-absorber device that engages, at the bottom, the bottom arm and, at the top, the supporting frame of the assembly or else the bottom panel of the vehicle (thereby meaning the bottom frame part on which the passenger compartment is obtained). Furthermore, in each assembly the suspension unit and the steering device are integrated in all their elements on the supporting frame, already determining, before the axle assembly is mounted on the rest of the frame of the vehicle, the kinematic chain and the geometrical configuration of this chain, that are designed to define the position and/or orientation of the wheel support with respect to the frame. In particular, in each axle assembly considered in itself, separately from the rest of the vehicle, the set of characteristic parameters of the suspensions, such as the angle of camber, the angle of incidence, the angle of convergence, the angle of Ackermann, etc., are already fixed. These parameters are defined within the two axle assemblies even before the latter are connected to the remaining part of the frame of the vehicle.

In the vehicle described herein, the two axle assemblies thus have altogether corresponding configurations, and constitute in themselves independent modules, already pre-assembled in their operating configuration. One of the two battery packs can be supplied directly by a set of photovoltaic panels, whereas the modules that make up the second battery pack can be replaced one by one with other charged modules.

Figure 4:
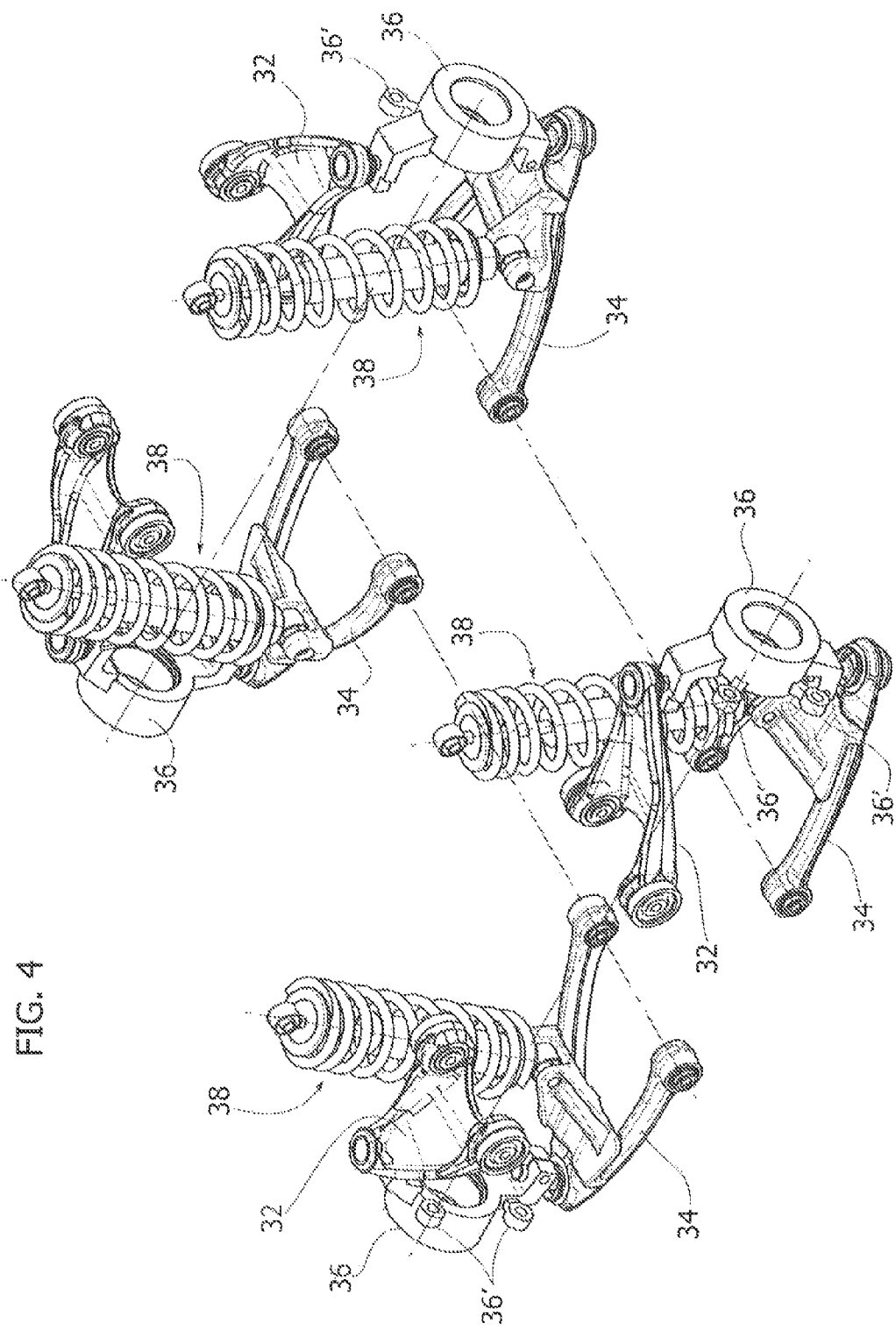
FIG. 4 is an exploded perspective view of the four suspension units of the motor vehicle of FIG. 1.

With reference now to the examples of embodiment illustrated, FIG. 4 shows only the set of the four suspension units 30 of the vehicle. As has been said, each unit is of the articulated-quadrilateral type. In particular, it comprises a top arm 32 and a bottom arm 34, which are both oscillating and roughly triangular in shape; the base sides of the arms are constrained to the frame 110 of the axle assembly, and to their distal ends are in turn constrained, via a ball joint, respectively the top arm and the bottom arm of the wheel support 36. In various preferred embodiments, as in the one illustrated, the bottom arm 34 is formed by two portions that can be connected together in different relative positions so as to enable adjustment of the length of the arm.

Figure 1:
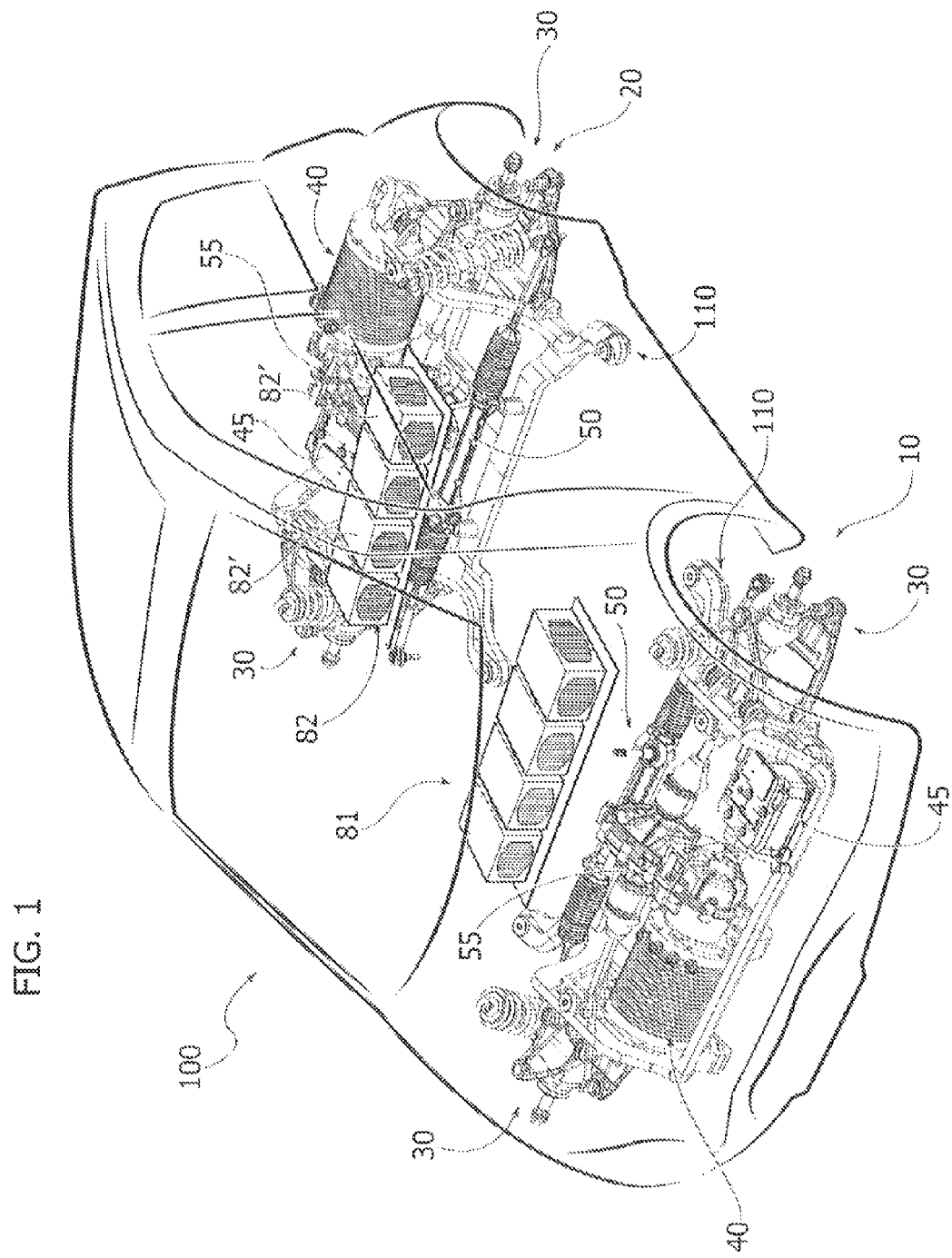
FIG. 1 is a schematic perspective view of an embodiment of the motor vehicle described herein.
Figure 2:
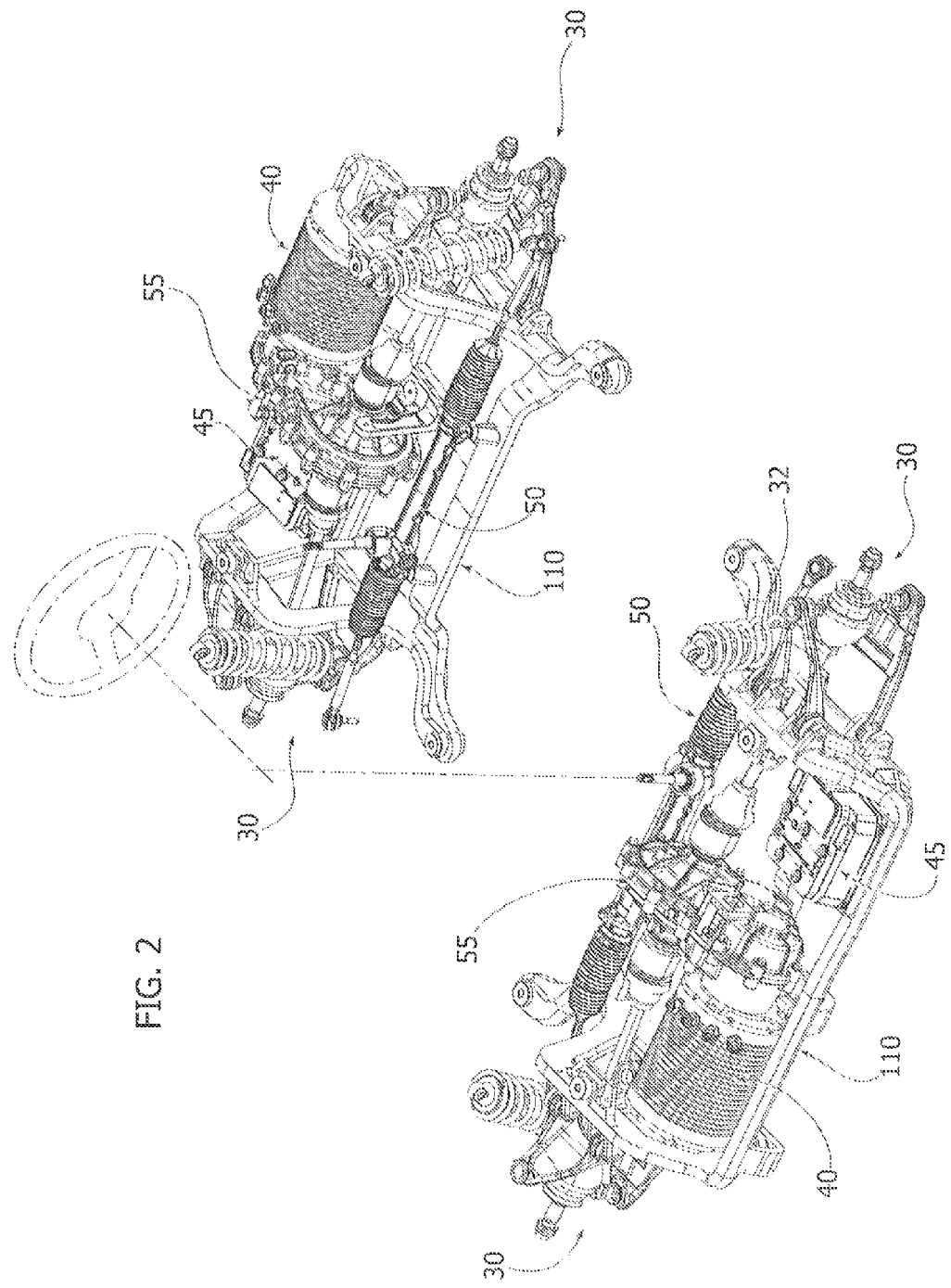
FIG. 2 is the two front and rear axle assemblies of the motor vehicle of FIG. 1.
Figure 3:
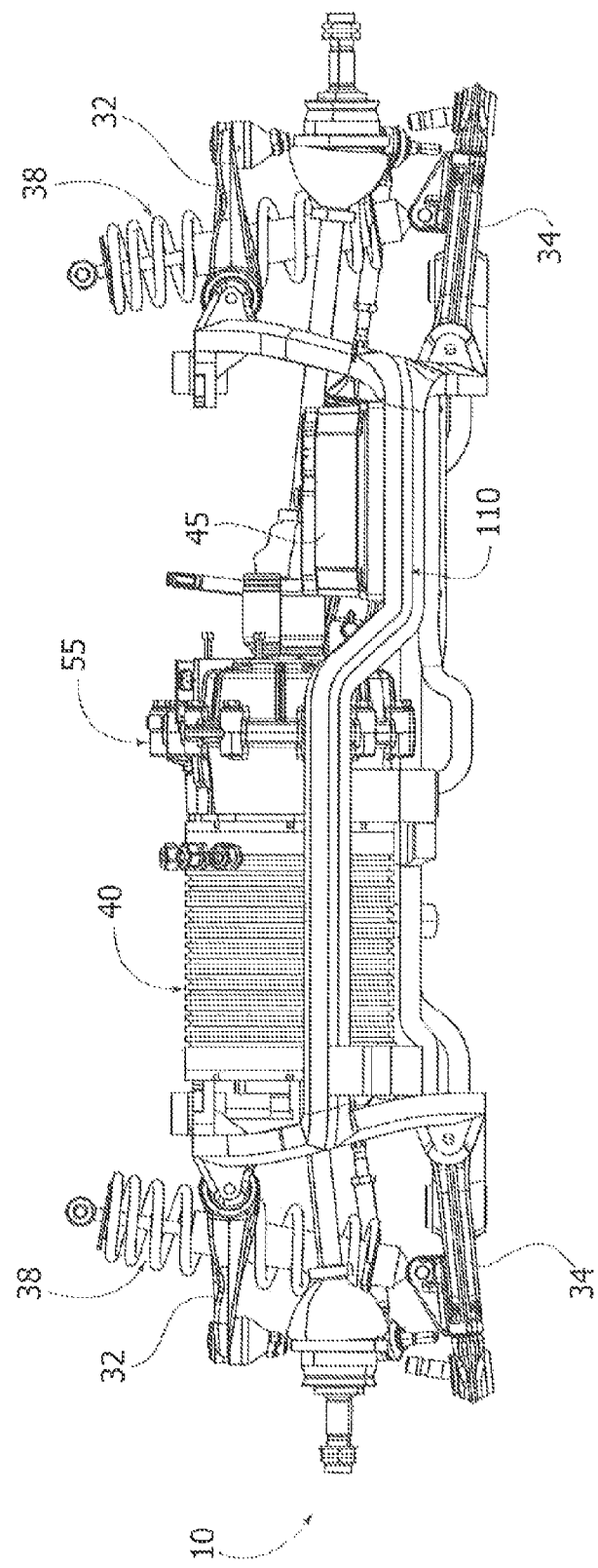
FIG. 3 is a front view of the front axle assembly of the motor vehicle of FIG. 1.

The shock-absorber device 38, which in the embodiment illustrated, is constituted by a hydraulic cylinder, associated to which is a helical spring, is hinged at its bottom end to the bottom arm 34, and, at its top end, to the frame 110, as in the embodiment of FIG. 8, or else to the bottom panel of the vehicle, as in the example illustrated in FIGS. 1 to 7. According to an important characteristic of the axle assemblies described herein, the points of constraint to the frame 110 of the base side of the top arm 32 are both shifted, with reference to the direction of motion of the vehicle, forwards or backwards with respect to the shock-absorber device 38. In particular, in the front axle assembly, these points are shifted forwards, whereas in the rear axle assembly they are shifted backwards. In other words, the points of constraint in question face towards the outside of the passenger compartment. As may be seen in FIG. 4, this configuration enables arrangement of the top ends of the shock-absorber devices within the distance subtended between the geometrical axes of the two axle assemblies and hence at a minimum distance, which simplifies construction of the frame of the vehicle). As regards the rear axle assembly, the aforesaid points of constraint of the top arm 32 can likewise be positioned forwards so that the corresponding shock-absorber devices will be shifted backwards in order to increase the internal space available, even though the bottom panel must be longer. The top ends of the shock-absorber devices 38 are located at a minimum height, and thus also the frame to which they are constrained, since these devices engage the bottom arms of the suspension units, and not the top arms. FIGS. 1 and 2 illustrate the suspension units 30 mounted on the frames 110 of the two axle assemblies.

The steering device 50, which is also mounted on the frame 110, connects up to the wheel support 36, by way of fixing eyelets 36' obtained therein, visible in FIG. 5C.

In the front axle assembly, the steering device is connected to the steering shaft associated to the steering wheel of the vehicle. The steering device in question may be of any type commonly used in the technical field in question; preferably, it is equipped with a servo-actuator that may be of a hydraulic or else electric type.

In the rear axle assembly, the steering device comprises, instead, an actuator 52 (illustrated only in the embodiment of FIG. 8) for automatic drive of the device, which may be rotary as in the figure, or else linear, set along the axis of the tie-rods of the steering. The actuator 52 is controlled by a control unit (not illustrated) of the vehicle configured for governing operation thereof in a way co-ordinated with operation of the steering device of the front axle assembly. It should be noted that in general vehicles with four steering wheels are already known in the art. The vehicle in question can thus use any control strategy already known in the art for co-ordinating the steering device of the rear axle assembly with the steering device of the front axle assembly. The vehicle described herein envisages, in addition, a particular control mode, that is to intervene in emergency manoeuvres. In particular, the aforesaid control unit is configured for activating said mode upon detection of a steering speed higher than a threshold value. This value is used as reference for distinguishing the emergency manoeuvres from the ones that, instead, fall within normal motion of the vehicle. The additional control mode used has the function of enabling fast changes of direction, at the same time maintaining stability of the vehicle, and/or stabilising the vehicle in the case of swerving thereof.

As has been seen previously, each axle assembly comprises a motor 40 for rotation of the wheels of the assembly, which is mounted on the supporting frame 110 and the output shaft of which is connected according to modalities of a known type to the hub carrier 37 of the two suspension units (which are visible in the embodiment of FIG. 8). In preferred embodiments, the motors of the two axle assemblies may both be of the magnetic-induction type or else may be of two different types, in particular a permanent-magnet synchronous motor for the front axle assembly and an induction motor or preferably a reluctance motor assisted by permanent magnets for the rear axle assembly. The two motors in question can be optimized on operating maps that are the same as one another, or otherwise on driving cycles that are different, for example the NEDC (New European Driving Cycle) for the front motor and the ARTEMIS cycle for the rear motor. The control unit of the vehicle is configured for co-ordinating their operation so as to obtain the best efficiency of propulsion possible. The distribution of the torque between the front and rear axles is applied as a function of the steering angle and the speed of the vehicle.

In the vehicle described herein, the power-supply module of the two electric motors is separate from the motor-driven axle assemblies, it being set directly on the frame of the vehicle. In various embodiments, as in the ones illustrated (see in particular FIGS. 2, 7 and 8), the power-supply unit is constituted by two distinct packs 81, 82, each of which is dedicated to power supply of a respective assembly and is set in the proximity of the latter. One of the two packs, preferably the one associated to the rear assembly, comprises a plurality of modules 82' coupled to the chassis-bottom panel via fast-coupling means, to enable easy removal thereof and their replacement with other modules that are charged. The front pack can be recharged in a totally independent way, for example via photovoltaic panels set on board the vehicle. The pack of the rear axle can be set either towards the outer side of the axle, as illustrated in the figure, or else inside the vehicle underneath the passenger seats.

In the vehicle described, the power-supply packs are preferably fixed on the chassis-bottom panel of the vehicle, so that, in the event of an accident, they will be less subject to any deformation of the frame 110 and of all the systems connected thereto. In an alternative configuration, the power-supply packs can, instead, be fixed directly to the frame 110, which for this purpose can be appropriately lengthened along the main axis of the vehicle. In this case, the modules will be distributed, preferably adjacent to the motor-differential assembly in order to lower the centre of gravity of the entire vehicle.

In general, the motor vehicle described herein may moreover comprise one or more of the following characteristics:
- the battery packs are independent of one another and serve the respective propulsion chain;
- at least one of the packs is constituted by standardized modules, which, when they are run down, can be taken out individually and replaced with other previously charged ones;
- the two battery packs are each preferably managed and monitored by a battery system for management thereof but can likewise be monitored by a single battery management system stored in which are algorithms for managing the state of charge, to ensure maximum autonomy of the vehicle;

a central data-processing unit is used for managing the two motor controllers, distributing supply of the current and hence of the torque in each of the axles in relation to the speed and to the steering angle;

at least one of these packs is constituted by standardized modules supplied through a DC-DC converter directly by one or more photovoltaic panels installed on board the vehicle;

a dedicated DC-DC unit has purpose of converting the voltage of the battery pack into the voltage necessary for the auxiliary systems;

the central data-processing unit, the two battery management systems, the motor controllers, the controllers of the actuators for change of gear ratio on the differential, the display, and the corresponding control panel on board the vehicle, and the other units for managing the vehicle are in communication with one another via one or more of the communication networks normally used in the automotive world;

in the suspension units of the two axle assemblies the points of constraint of the top arm to the supporting frame are shifted backwards in the front axle assembly, and shifted forwards in the rear axle assembly, with respect to the shock-absorber device, so as to increase the distance between the respective shock-absorber devices of the two assemblies; they may, however, be set forwards in the rear axle assembly, so that the corresponding shock-absorber devices are shifted forwards, in order to increase the space inside the passenger compartment.

It should now be noted that the frame 110 of each of the two axle assemblies is constituted by an enbloc body made of metal alloy or polymer-metal alloy, provided on which are all the points of constraint and fixing of the suspension units, of the steering device, and of all the other elements carried thereby, and moreover provided on which are the portions of connection of the frame to the bottom panel of the vehicle.

Figure 6B:
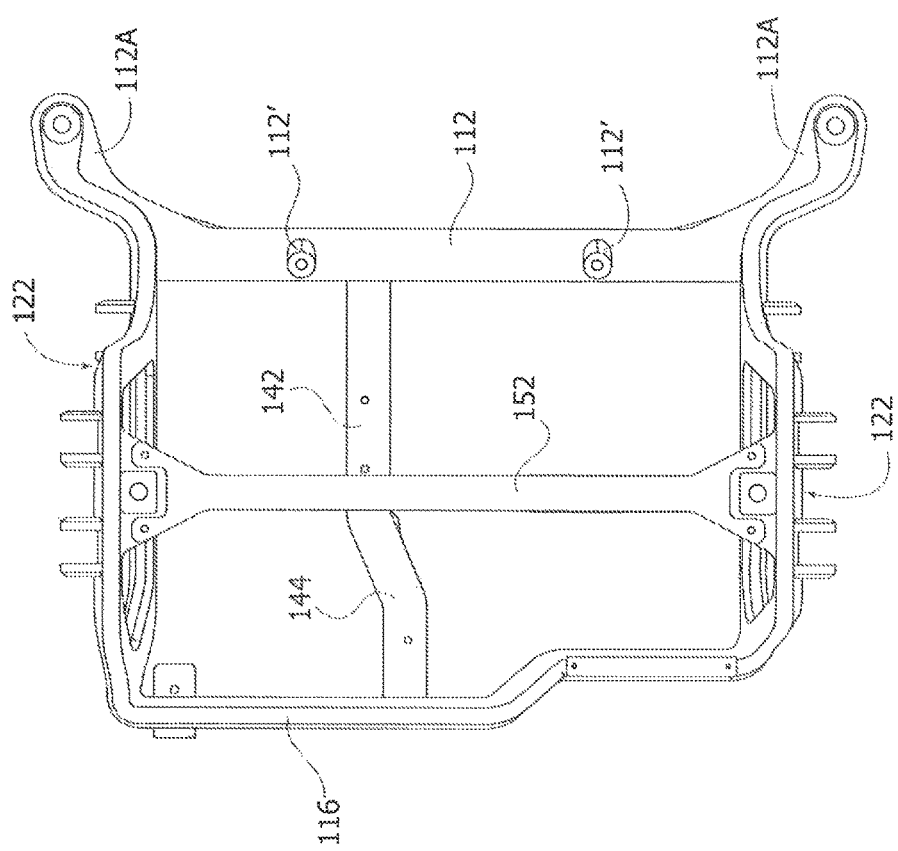

With specific reference to FIGS. 6A and 6B, in various preferred embodiments, as in the one illustrated, the enbloc body includes:

a first transverse beam 112, a second transverse beam 114, and a third transverse beam 116, in which the first beam 112 is located in the rear part or front part of the frame (according to whether it is of the front axle assembly or the rear one, respectively, as will emerge clearly from what follows), the third beam 116 is located in the front part or rear part (according to whether it is the rear axle assembly or the front one), whereas the second beam 114 is located in a substantially intermediate position;

two opposed lateral uprights 122, connected together by the beams 112, 114 and 116, each defining an annular structure that extends in a plane transverse to the beams themselves.

The annular structure of the two uprights is defined by a bottom longitudinal beam 122A that joins the three beams 112, 114 and 116, a top longitudinal beam 122B, and three pillar portions 122C, 122D, 122E that join the top beam 122B and the bottom beam 122A. The central pillar portion 122D of one of the two ring-shaped structures has a supporting plate 131, and in the same way, the top beam of both of the structures has a substantially central plate set in cantilever fashion 132, arranged on which are first means for connection to the bottom panel of the motor vehicle. In various preferred embodiments, these means comprise a hole 132' made in the aforesaid portions, for fixing them to the bottom panel of the motor vehicle via bolts or similar connection elements, and a ring made of rubber (not illustrated) set on the hole, which is set between the aforesaid portions and the frame of the motor vehicle with the function of shock-absorber element.

In a similar way, the third beam 116 has a further supporting plate 134, set in cantilever fashion towards the inside of the frame and in a central part thereof.

Furthermore, the frame 110 comprises a bottom longitudinal beam 142 that is set between the lateral uprights 122 and joins the first beam 112 and the second beam 114, and a further bottom beam 144 that is substantially aligned to the second bottom beam and joins the second transverse beam and the third transverse beam.

The first beam 112 has end portions 112A, which project towards the rear side with respect to the lateral uprights 122, in a substantially longitudinal direction or in any case in a direction comprised between the longitudinal direction and the transverse direction of the vehicle, and arranged on which are further means for connection to the bottom panel of the motor vehicle, similar to the ones described above (see in this connection the holes 112A').

The frame 110 moreover comprises a top cross member 152, which is fixed, at its opposite ends, for example via bolts, to the plates 132 of the two lateral uprights, and is located substantially on top of the second transverse beam 114. This cross member has an arched raised central portion 152A, and, in a corresponding position, the second transverse beam 114 has, instead, a lowered portion 114A, which is also arched. These arched portions define a space, between the cross member and the second beam, suited to receiving the casing of the transmission unit 55.

In various preferred embodiments, as in the one illustrated, the top and bottom beams of the two uprights each have perforated vertical plates 136, set at a distance from one another in an appropriate way, which define the points of constraint of the arms of the suspension units to the frame 110.

In various preferred embodiments, as in the one illustrated, the steering device is mounted on the first transverse beam 112, the transmission unit 55 is mounted on the longitudinal beams 142 and 144, and the electric motor is mounted on the supporting plates 131 and 134. For this purpose, the first transverse beam 112 has at least two perforated frustoconical or cylindrical formations 112', which are designed to receive two corresponding pins provided in the structure of the steering device. In a similar way, the longitudinal beams 142 and 144 have one or more holes 142' and 144' for fixing the casing of the transmission unit, via bolts or similar connection elements.

Thanks to the characteristics referred to above, the structure of the two axle assemblies is very compact, even though each assembly provides all the devices and the units that have been referred to. The advantages deriving from the possibility of using the same structure for both of the axle assemblies, hence emerge clearly as regards the purpose of producing a motor vehicle with good qualities of performance and a high level of manoeuvrability, but, at the same time, contained costs.

With reference now to FIGS. 2 and 7, it may be noted how in the motor vehicle described herein the two axle assemblies are arranged according to a diametrally opposite orientation, so that, in the rear axle assembly, the beam 112, which is connected to the bottom panel of the vehicle, faces in the direction of advance, whereas, in the front axle assembly, the same beam faces in the opposite direction. Consequently, as mentioned previously, in the front axle assembly, the beam 112 is located in the rear part of the frame 110 and the beam 116 in the front part, whereas, in the rear axle assembly, the former is located in the front part of the frame and the latter in the rear part.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. An electric-propulsion vehicle, comprising:
a motor-driven front axle assembly; and
a motor-driven rear axle assembly;
wherein said assemblies both comprise:
a supporting frame, two wheel-suspension units, an electric motor for driving the wheels in rotation, a control unit for controlling said motor, a differential transmission unit with one or more gear ratios, and a steering device for regulating the angular position of the wheel supports of said suspension units with respect to said frame; said motor, said transmission unit, said suspension units, and said steering device being mounted on said supporting frame;
wherein said suspension units are of the articulated-quadrilateral type with oscillating bottom arm and top arm, and comprise a shock-absorber device that engages, at the bottom, said bottom arm and, at the top, said supporting frame or else the frame of the motor vehicle on which the passenger compartment thereof is obtained,
and in that, in each axle assembly, said suspension units and said steering device are integrated on said supporting frame so as to determine within said assembly the kinematic chain, and the geometrical configuration of said chain, that are designed to define the position and the orientation of the wheel support with respect to the frame of said motor vehicle, in such a way that said axle assembly constitutes a pre-assembled module removably mounted on said frame of said motor vehicle.

2. The motor vehicle according to claim 1, wherein in said axle assemblies all the points of constraint of said top arm to said frame are shifted with respect to said shock-absorber device forwards or backwards, with reference to the direction of advance of said vehicle.

3. The motor vehicle according to claim 2, wherein in said front axle assembly said points of constraint are shifted forwards, and wherein in said rear axle assembly said points of constraint are shifted backwards so as to minimize the relative distance between the shock-absorber devices of the front axle assembly and the shock-absorber devices of the rear axle assembly.

4. The motor vehicle according to claim 2, wherein in said rear axle assembly said points of constraint are shifted forwards so as to increase the space inside the passenger compartment.

5. The motor vehicle according to claim 1, wherein said supporting frame comprises an enbloc body that includes:
at least one first transverse beam and one second transverse beam;
two opposed lateral uprights, which are connected together by said first and second beams and each define an annular structure that extends over a plane transverse to said first and second beams, said annular structure comprising a bottom longitudinal beam that joins said first and second beams, and a top longitudinal beam;
wherein said steering device or said motor or said transmission unit are mounted on said first transverse beam or said second transverse beam; and
wherein said top arm and said bottom arm of said suspension units are mounted oscillating, respectively, on said top beam and on said bottom beam of said annular structure.

6. The motor vehicle according to claim 5, wherein said first transverse beam is located in the rear part or front part of said frame and has end portions that project towards the rear side with respect to said uprights, substantially in a longitudinal direction of said motor vehicle or in any case a direction comprised between said longitudinal direction and the transverse direction of said motor vehicle, on said portions means being provided for connection to said frame of said motor vehicle, and wherein on said top longitudinal beam of said uprights further means are provided for connection to said frame of said motor vehicle.

7. The motor vehicle according to claim 6, wherein said frame comprises a first bottom intermediate longitudinal beam, which is set between said lateral uprights and joins said first and second transverse beams.

8. The motor vehicle according to claim 7, wherein said frame of said axle assembly comprises a third transverse beam that is set in the front part or rear part of said frame and that joins said lateral uprights, and, moreover, a second bottom intermediate longitudinal beam, which is substantially aligned to said first intermediate longitudinal beam and joins said second transverse beam and said third transverse beam.

9. The motor vehicle according to claim 8, wherein said annular structure of said lateral uprights has a central pillar portion that connects said bottom longitudinal beam and said top longitudinal beam, wherein, in at least one of said uprights, said central pillar portion comprises a supporting plate, and wherein said third transverse beam has a further supporting plate.

10. The motor vehicle according to claim 9, wherein said steering device is mounted on said first transverse beam, said transmission unit is mounted on said first intermediate longitudinal beam, and said motor is mounted on said supporting plates.

11. The motor vehicle according to claim 5, wherein said transverse beams and said lateral uprights of said supporting frame are made of high-strength sheet steel, bent and electrowelded.

12. The motor vehicle according to claim 1, wherein provided on said uprights are perforated plates for connection of said oscillating arms on said frame, which are electrowelded to said uprights.

13. The motor vehicle according to claim 1, wherein the bottom arm of said suspension units has two portions that can be connected together in different relative positions so as to enable a regulation of the length of said arm.

14. The motor vehicle according to claim 1, wherein said electric motor of said front axle assembly and said electric motor of said rear axle assembly are optimized on different driving cycles.

15. The motor vehicle according to claim 1, wherein said electric motors of said front and rear axle assemblies are both induction motors.

16. The motor vehicle according to claim 1, wherein said electric motors are of a different type and in particular said electric motor of said front axle assembly is a permanent-magnet synchronous motor and said electric motor of said rear axle assembly is an induction motor or reluctance motor assisted by permanent magnets made with ferrites or rare earths.

17. The motor vehicle according to claim 1, wherein each axle assembly is supplied by a battery pack of its own and said pack is fixed on said frame of said motor vehicle and not on said supporting frame.

18. The motor vehicle according to claim 1, wherein each axle assembly is supplied by a battery pack of its own and said pack is rigidly fixed on said supporting frame and is set adjacent to said motor and to said transmission unit so as to minimize the height of the centre of gravity of the motor vehicle.

19. The motor vehicle according to claim 1, wherein each battery pack on its own axle assembly is managed by a battery management system.

20. The motor vehicle according to claim 1, wherein the two battery packs, during the charging step, are supplied alternately by a solid-state power-switch system that addresses at intervals in the region of a few seconds the charge towards one or the other of the battery packs.

\* \* \* \* \*